FIG. 1.

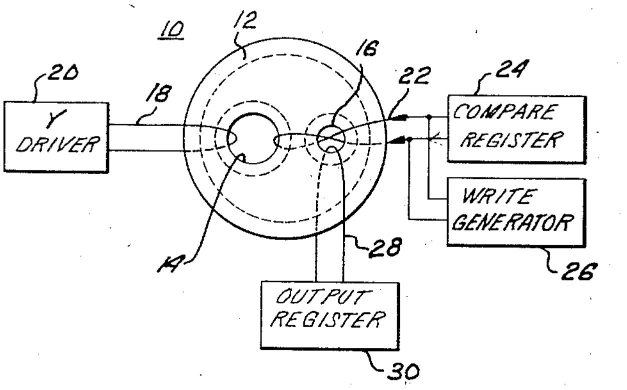

FIG. 2.

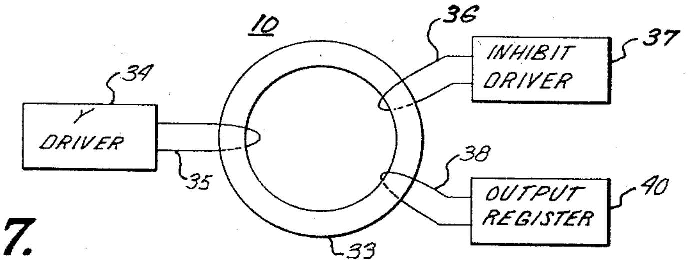

FIG. 7.

| | INFO STORED IN COMPARE REGISTER 24 | INFORMATION STORED IN MEMORY CELL-10 | |
|---|---|---|---|
| | | 0 | 1 |
| STATE BEFORE READY PULSE | |  | 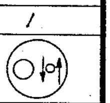 |
| STATE AFTER READY PULSE | 0 |  | 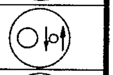 |
| | 1 |  |  |
| COMPARE PULSE — VOLTAGE PER CELL-10 ON OUTPUT WIRE (ARBITRARY UNITS) | 0 | 0 | +1 |
| | 1 | 0 | -1 |
| VOLTAGE PER CELL-10 DEVELOPED BY BIAS GENERATOR-42 (ARBITRARY UNITS) | 0 | 0 | 0 |
| | 1 | +1 | +1 |
| SUMS OF VOLTAGES PER CELL-10 FROM OUTPUT WIRE AND BIAS GENERATOR 42 (ARBITRARY UNITS) | 0 | 0 | +1 |
| | 1 | +1 | 0 |

INVENTOR.
ROBERT C. MINNICK
BY Christie, Parker & Hale
ATTORNEYS

INVENTOR.
ROBERT C. MINNICK
BY
Christie, Parker & Hale
ATTORNEYS

INVENTOR.
ROBERT C. MINNICK

BY Christie, Parker & Hale
ATTORNEYS

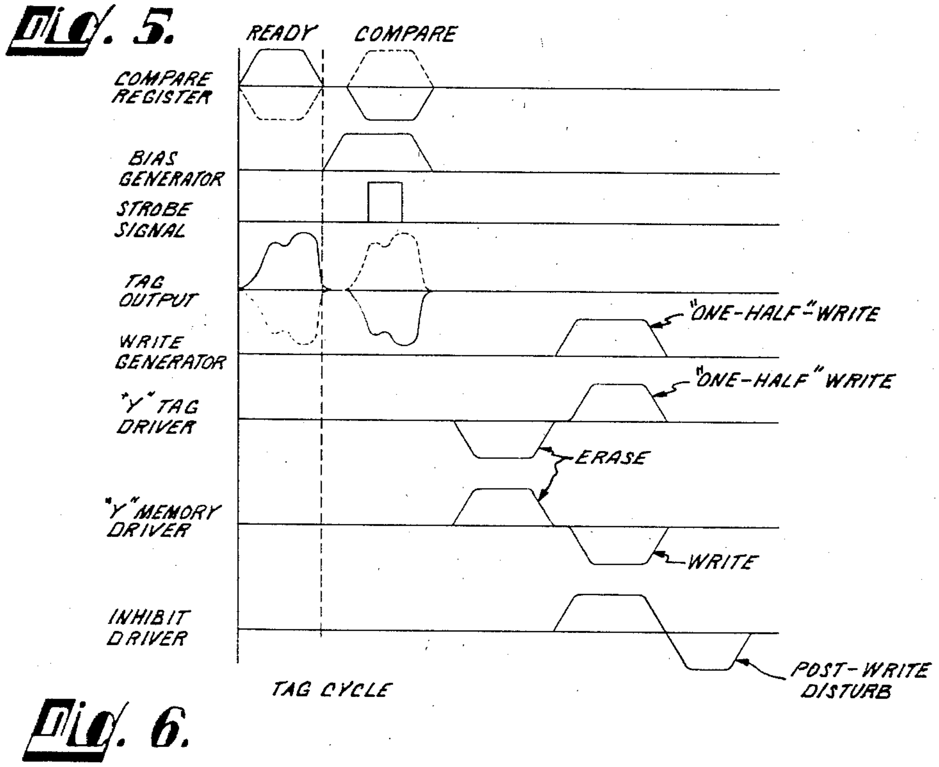
FIG. 6.
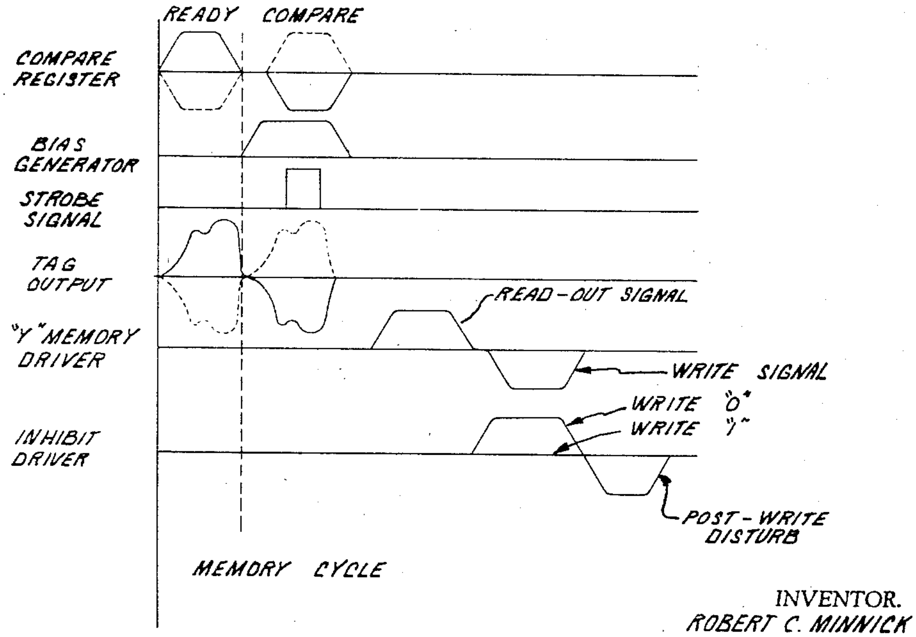
INVENTOR.
ROBERT C. MINNICK
BY
Christie, Parker & Hale
ATTORNEYS April 8, 1969 R. C. MINNICK 3,438,017

STORAGE APPARATUS FOR COMPARING INFORMATION

Filed Dec. 12, 1958 Sheet 5 of 6

INVENTOR.
ROBERT C. MINNICK
BY
Christie, Parker & Hale
ATTORNEYS

INVENTOR.
ROBERT C. MINNICK
BY
Christie, Parker & Hale
ATTORNEYS

United States Patent Office 3,438,017

Patented Apr. 8, 1969

3,438,017

STORAGE APPARATUS FOR COMPARING INFORMATION

Robert C. Minnick, Arcadia, Calif., assignor to Burroughs Corporation, Detroit, Mich., a corporation of Michigan Filed Dec. 12, 1958, Ser. No. 780,056

Int. Cl. G11b 5/44

U.S. Cl. 340—174 25 Claims

This invention relates to storage apparatus and more particularly to a method and apparatus for obtaining direct access to any of the memory cells of the storage apparatus. In one of its more particular aspects this invention relates to an improved magnetic core memory system.

One of the features of a memory system that must be considered when selecting any storage apparatus to be incorporated into a computing or control system and the like is the access time of the storage device. The shorter the access time the higher the operating speed possible for the associated computer and vice versa. The access time of storage apparatus is dependent on the method of selection or searching out of the desired information stored in the device and which selection procedure varies from direct access to each memory position or cell to the sequential examination of each cell.

In conventional random access magnetic memory systems, such as described by J. A. Rajchman in the article, "Static Magnetic-Matrix Memory and Switching Circuits," which appeared in the R.C.A. Review in June 1952, each memory cell, or word, is assigned a physical location designated by a number or address. If the programmer desires to read or write a word in a given location, he must designate the address of the word in question.

It is often useful, however, for the programmer to assign designations other than the address to his words; for instance, the word might be the information associated with some item in inventory, while the designation of this word might be a part number. For convenience, designations of this class may be termed tags.

Using present systems of random access memory, if the programmer wishes to refer to a word having a given tag, he must refer to a translation table between tags and addresses, or he must search through at least some of the words in memory, or he must otherwise follow complicated and time-consuming procedures. The present invention provides an improved memory system allowing direct access from designation of the desired tag to the associated memory cell.

Each word stored in the memory has associated with it a tag, which is determined by the programmer, and is stored by means which are similar in their programming aspects to the storing of a word. The programmer does not necessarily have knowledge of the physical location of the words in the memory. He need only specify the desired tag, and the system to be described will serve automatically to locate the associated word. A feature of this system is that it performs a comparison of the desired tag and all stored tags in the memory simultaneously.

The invention is described in conjunction with magnetic memories comprising two portions, namely a tag or word identification portion and a memory portion. The tag or identifying digits for the word are presented to the tag portion of the memory and which tag information is applied in parallel to each memory cell comprising the tag portion. This application of the tag information in accordance with this invention will be effective to sense or read out the matching tag. The tag portion of the memory is advantageously arranged so that only the matching tag will provide a locating signal characteristic of a match, while the other tags will produce a different signal characteristic of a mismatch. The locating signal may then be employed directly to read out the associated word or information associated with that particular tag and having a corresponding location in the memory. By this novel and improved method of operating a memory system, the words previously stored in the tag and in the memory portion may be erased and a new word and a tag substituted therefor; also, with just the knowledge of the tag information, a word may be read out of the memory directly.

Briefly an embodiment of the present invention comprises apparatus comprising a plurality of memory cells for storing coded information and arranged in a preselected pattern of information groups. Means is provided for substantially simultaneously applying coded input information to each information group of memory cells for determining the presence and/or location of the input information by the generation of output signals from each memory cell whereby a composite output signal for each information group indicates the presence and/or location of the input information by a unique signal.

Briefly, a method in accordance with the present invention for comparing and locating stored information from a plurality of memory cells arranged in a preselected pattern of information groups storing information includes the steps of simultaneously applying a signal to be compared to each group of said memory cells to read out a signal representative of the information stored in each cell. The read out signals from each information group are then compared with the same signal characteristic of the information to be retrieved to thereby produce a unique signal when a group of the memory cells store the same group of binary coded signals as delivered thereto.

These and other features of the present invention may be more fully appreciated when considered in the light of the following specification and drawings, in which:

FIG. 1 is a schematic representation of a typical memory cell utilized in the word identification portion of the storage apparatus;

FIG. 2 is a schematic representation of a conventional memory cell utilized in the word storage portion of the storage apparatus;

FIGS. 5 and 6 are graphical representations of wave forms appearing in the different portions of the storage apparatus;

FIG. 7 is a chart indicating the relative values of electrical signals appearing in the word identification portion of the storage apparatus;

Figure 10:
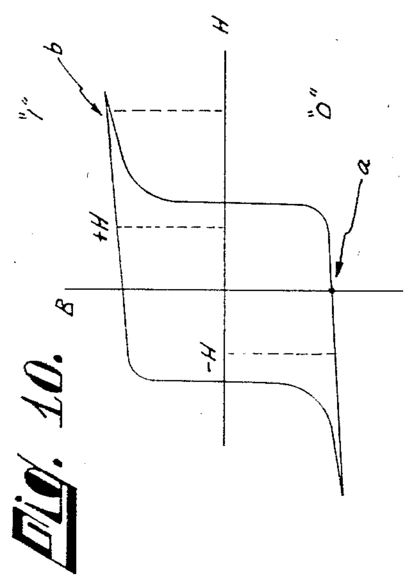
FIG. 10 is a graphical representation of a typical hysteresis characteristic for the memory cells described.

Now referring to FIG. 1 the operation of the memory cell 10 for the word identification or tag portion of the novel storage apparatus will be described. The memory cell 10 shown in FIG. 1 comprises a magnetic element 12 having multiple apertures 14 and 16. The magnetic element 12 has a substantially square or rectangular hysteresis characteristic of the type shown in FIG. 10. The apertures 14 and 16 are so arranged and proportioned as to define three magnetic legs in the core, shown as the legs 1, 2, and 3. The larger aperture 14 is positioned adjacent the left hand side of the core as shown in FIG. 1 and inwardly thereof so as to define leg 1, while the aperture 16, the smaller aperture, is arranged inwardly of the right hand edge of the magnetic element 12 so as to define legs 2 and 3 on opposite sides thereof. The smaller aperture 16 is arranged and proportioned so that the legs 2 and 3 are substantially equal in cross section while the aperture 14 is proportioned so that leg 1 is equal in cross section to legs 2 and 3 or greater. Multiple flux paths may then be traced around the apertures 14 and 16. One flux path extends between legs 1 and 3 around the apertures 14 and 16. Another flux path extends between legs 1 and 2 around aperture 14 while yet a third flux path is around the aperture 16 in legs 2 and 3. The above traced multiple flux paths are indicated in FIG. 1 on the magnetic elements 12 by dotted lines.

The windings for controlling the magnetic element 12 includes a Y drive winding 18 interlaced through the large aperture 14 to control the magnetic flux in leg 1. The Y drive 18 is shown connected to a signal source identified as the Y drive 20 and which signal source 20 is illustrated in block form. A compare winding 22 coupled to a compare register 24 is interlaced through both the aperture 16 and the aperture 14 in a "figure 8" configuration as illustrated. The compare winding 22 is provided principally to control the flux in leg 3 while the portion of the "figure 8" linking leg 2 is utilized to improve the discrimination of the core. A write generator 26 is shown connected to the compare winding 22 in parallel circuit relationship with the compare register 24. A sensing winding or output winding 28 is shown interlaced through the small aperture 16 and coupled to an output register 30. The sense winding 28 is arranged so as to be responsive only to the flux changes in leg 3 to provide an output signal for the register 30.

Assuming no previous magnetic history for the magnetic element 10, so that when an intense current pulse is sent from the Y drive source 20 through the winding 18 to produce a counter-clockwise flux flow through legs 1, 2, and 3, it will saturate legs 2 and 3. This is possible since the leg 1 is larger and provides the necessary return path for legs 2 and 3. These legs 2 and 3 will remain saturated after the termination of the pulse since the remanent and saturated inductions for the magnetic element 12 are almost equal. With the element 10 in this magnetic state, if a signal is delivered from the compare register 24 to the compare winding 22 producing an alternating magnetomotive force along a path surrounding the smaller aperture 16 but of insufficient amplitude to produce a significant flux change around the aperture 14, this magnetomotive force will have a counter-clockwise sense and tends to produce an increase in flux in leg 3 and a decrease in flux in leg 2. It will be seen that no increase of flux will be possible in leg 3 because it is saturated, consequently there can be no flux flow at all since magnetic flux flow is necessarily in a closed path. Similarly during the opposite phase of the compare signal the magnetomotive force is in a clockwise sense and tends to produce an increase in flux in leg 2 which is again impossible since that leg is saturated also. Under these conditions the flux flow is said to be "blocked" as the result of the direction of saturation of either leg 2 or 3. It will also be appreciated that the magnetic element 12 in its "blocked" state will not provide a flux change linking the sense winding 28 and therefore no output voltage is induced therein.

If now a current pulse is provided from the Y drive source 20 through the winding 18 in a direction producing a clockwise magnetomotive force such that the magnetizing force in leg 2 is large enough to switch the flux in leg 2 but not of sufficient intensity to change the magnetic state of leg 3, leg 2 following the application of this pulse will be saturated downwardly or in a clockwise sense while leg 3 will be saturated in an upward direction or counter-clockwise. With the magnetic element 12 in this magnetic state and upon applying an alternating magnetomotive force around the small aperture 16 resulting from energizing the compare winding 22 from its associated register 24, a corresponding flux flow around aperture 16 will result. The first clockwise phase of the alternating current will reverse the flux, and the next counter-clockwise phase will reverse it again, and so on indefinitely. This alternating flux flow will now induce an output voltage in the sense winding 28. This magnetic condition of the element 12 will be termed the "unblocked" state of the element.

A more detailed analysis of the operation of the magnetic element 12 may be had by reference to the Proceedings of the Institute of Radio Engineers for March 1956 in which an article entitled "The Transfluxor" by J. A. Rajchman and A. W. Lo appears on pp. 321–332. The "figure 8" windings for the magnetic element 12 is specifically described in the publication of J. A. Rajchman and H. D. Crane in the "Institute of Radio Engineers-Transactions on Electronic Computers" for March 1957, pp. 21–30.

It will be recognized from the above description that the "unblocked" state of the magnetic element 12 has two magnetic configurations depending on the direction of the flux flow around the aperture 16. For the purposes of this invention, the two "unblocked" states are utilized to give an output indication as to whether the e lement 12 stores the same or a different signal from the compare register 24. All signals developed on the sense winding 28 representative of a match or a mismatch are arranged to have the same polarity. To assure the magnetic element 12 is at all times in the correct "unblocked" state selected to provide an output indication indicative of a match or mismatch, the compare register 24 is arranged to provide a "ready" pulse prior to reading out or sensing the element 12. The "ready" pulse will produce a magnetic force in leg 3 such as to place the magnetic element 12 in the selected "unblocked" state corresponding to a match or mismatch, if it is not already there. This may be seen from an examination of FIG. 7, wherein the flux configuration of a memory cell 10 storing a binary "one" has a different flux path after the application of the "ready" pulse depending on whether the compare register 24 stores a binary "one" or "zero." Accordingly, the magnetic element 12 will be read out or sensed by a second signal of opposite polarity to the "ready" pulse and which signal will be seen to switch the element 12 back to the unselected "unblocked" state. Only this latter signal will produce the output signal on the sense winding 28 for actuating the output register 30. It will also be seen that his method of reading-out or sensing the magnetic element 12 does not destroy the stored information and the interrogation may be repeated any number of times. Also, the element 12 may be termed a non-destructive memory cell.

The "blocked" and "unblocked" states of the magnetic element 12 are further identified for the purposes of this invention in terms of a binary code so that the "blocked" state corresponds to the binary "zero" while the "unblocked" state will represent the binary "one." Accordingly, when the magnetic element 12 is set in a binary "zero" state, no output signal will be provided at the sense winding 28, while when the element 12 is in the binary "one" state a compare signal will produce a "one" output signal at the winding 28. The binary state of the magnetic element 12 may be changed or erased through the provision of the current from the Y drive source 20 to the winding 18 so as to reverse the magnetic saturation of legs 2 or 3 to place it back in the "blocked" state. The magnetic element 12 is driven to place all flux paths in a counter-clockwise sense, no matter what the previous flux configuration.

The erasing, writing, and reading or sensing of the magnetic element 12 will now be summarized. The erasing of the element 12 consists of setting it to the binary "zero" or "blocked" state. This is accomplished by the application of a current from the Y drive source 20 to the winding 20. This erasing current will be of such a polarity and intensity to saturate legs 2 and 3 in a counter-clockwise sense. This erasing operation is arranged always to precede a writing operation, so that the writing operation as employed herein always consists of changing the state of the element 12 from binary "zero" to binary "one." The writing of the binary "one" is accomplished by the coincidental application of a signal from the Y drive source 20 and a signal from the write generator 26. Neither of these signals alone is effective to switch the element 12 and may be considered a one-half select current. The one-half select current provided by the Y driver source 20 will be of opposite polarity from the current provided for the erasing operation. The coincidental action resulting from energizing the Y drive winding 18 and the compare winding 22 is such that the magnetic forces add in leg 2 to switch the state thereof but oppose one another in leg 3, leaving it unswitched or in its original condition. The energization of the compare winding 22 for writing results from the delivery of a current pulse from the write generator 26. The reading operation or non-destructive sensing results from the sole energization of the compare winding 22 from the compare register 24. The compare register 24 will provide the pair of pulses identified as the "ready" pulse and the read-out or sensing pulse. If the compare register 24 stores a binary "one," the ready pulse will be assumed to be positive and the following read-out pulse will be negative. Similarly, if the compare register 24 stores a binary "zero" the ready and read-out pulses will be respectively negative and positive. Accordingly, when the magnetic element 12 is in the "zero" state no output voltage results from the read-out operation regardless of whether the register 24 stores a "one" or a "zero." If the register 24 stores a "zero" and the element 12 is in the "one" state, a positive voltage results, while when the register 24 stores a "one" and the element 12 is in the "one" state the opposite polarity or a negative output voltage results. These storage states may be better appreciated from an examination of FIG. 7.

Referring now to FIG. 2, the memory cell 10 utilized in the word storage or memory portion of the novel storage apparatus will be described.

The memory cell 10 comprises a magnetic element or core 33 of toroidal configuration having a unique flux path and of bistable storage capabilities due to its substantially rectangular hysteresis characteristic. A Y drive source 34 coupled to a Y drive winding 35, in turn coupled to the magnetic core 33, is provided and which elements correspond to the Y elements for the magnetic element 12 of the tag portion of the storage apparatus. The Y source 34 and Y winding 35 are utilized to write binary coded signals into and to read them out of the magnetic core 33. This reading and writing operation is provided by using currents of opposite polarity for the winding 35.

It should be noted at this point that the magnetic core 33 does not have a non-destructive read out characteristic. Accordingly, a read out operation erases the stored information and it is necessary that any information read out of a memory core 33 be written back in if it is desired to retain same in storage. The writing operation consists of switching the memory core 33 to its "one" state from the opposite state or "zero" storage condition. When a "zero" is to be written into a core 33, a magnetomotive force in opposition to the magnetomotive force provided upon the energization of the Y winding 35 is required. This is necessary since the Y winding 35 is coupled to all the magnetic cores 33 in a row, as is well known. This opposing or inhibiting force is provided by a separate inhibit winding 36 coupled to the core 33 and energized from the inhibit drive source 37 connected thereto. The simultaneous energization of the windings 35 and 36 will prevent the core 33 from switching and will thereby "write" a "zero" into same. The read-out operation will switch any core 33 from the "one" to the "zero" state and in so doing will induce a voltage in output or sense winding 38 coupled to the core 33. In this fashion an output register 40 connected to the sensing winding 38 will be switched in response to each "one" read out of the memory core 33. This configuration and organization of the memory core 33 is conventional. Magnetic core circuits and systems of this type are discussed and described in a text entitled "Digital Computer Components and Circuits," by R. K. Richards, published by D. Van Nostrand Co., Inc., beginning on p. 354, and which publication is incorporated herein by reference.

The organization of the above described memory cells 10 in the novel storage apparatus will now be described. The tag or word identification portion of the storage apparatus will be first described for a two dimensional array of memory cells 10. The memory cells 10 for the tag portion includes a plurality of the magnetic elements 12 arranged on a single memory plane having three horizontal rows and four vertical columns. Words are stored on this memory plane along the horizontal rows and therefore each word consists of four binary bits or binary characters each.

The windings for the magnetic elements 12 are the same as those described in conjunction with FIG. 1, for the array illustrated; however, the windings are interlaced through each of the magnetic elements 12 in the particular row or column as the case may be. Specifically, the Y driver windings 18 are interlaced through the large apertures 14 for each of the magnetic elements 12 in the particular rows. The rows are identified as Y1, Y2, and Y3, reading from top to bottom of FIG. 3. In the same fashion the sense windings 28 are interlaced through the small aperture 16 for each of the magnetic elements 12 arranged in the rows Y1, Y2, and Y3. The individual compare windings 22 are interlaced through the magnetic elements 12 for each column and are individually coupled to a separate register for that column provided for in the compare register 24. The individual registers store the binary characters representing the tag word and are identified as $Z_1$, $Z_2$, $Z_3$, and $Z_4$, as shown. The compare register 24 may comprise a plurality of vacuum tube or transistor bistable storage elements such as conventional "flip-flops."

A bias generator 42 is also provided and is coupled in series circuit relationship with each of the sense windings 28 thereby to add its output signal with each group of signals appearing on the sense windings 28. The bias generator 42 is arranged to provide an output signal characteristic of the number of a preselected binary character stored in the compare register 24, in this instance the number of binary "ones." The bias generator 42 may take the form of an array of transfluxors. When such a bias generator 42 is utilized, it will be necessary to deliver the binary coded information representing the word identification or tag to this bias generator 42. The bias generator 42 may also include a reference voltage source and which reference voltage is arranged in a series circuit relationship with the output of the bias generator 42 to be combined with the voltage on each of the sense windings 28.

The write generator 26 is coupled to the compare windings 22 in parallel with the compare register 24. It should be noted that the compare register 24 may be utilized to perform the function of the write generator 26 as well. The write generator 26 may be of the type presently utilized for the inhibit drivers to be discussed.

Assuming that the word identification or tag portion of the storage apparatus has been previously written into so that the word stored in the Y1 line of elements 12 is represented by the binary characters 1001, and that the Y2 line stores the binary characters 1010, the operation of the tag portion of the storage apparatus for reading out a tag therefrom will be examined. It will be assumed that the compare register 24 has been actuated to store the tag 1001, reading the compare register characters $Z_1$–$Z_4$ from left to right. This reading out operation is essentially a simultaneous comparison or sensing operation which is initiated by the application of a ready pulse from the compare register 24 to each of the compare windings 22 as described hereinabove. This ready pulse will place all of the "unblocked" magnetic elements 12, those storing a binary "one," in the selected "unblocked" state. Following the application of the ready pulse the compare pulse is applied to each of the compare windings 22 and which pulses are also derived from the compare register 24. The polarity of the compare pulses will be negative for the binary "ones" and positive for the binary "zeros" and which polarities are opposite to those provided for the ready pulses.

The voltages appearing on the output windings 28 as a result of the application of these compare pulses for each magnetic element 12 may be readily determined from an examination of the chart of FIG. 7. In using this chart the binary state of the particular magnetic element 12 under consideration is aligned with the binary value of the information stored in the compare register 24 for the particular column at the horizontal column identified as "compare pulse-voltage per cell 10 on output wire 28." Following this approach the magnetic element 12 having the coordinates Y1, $Z_1$ and which element stores a binary "one" will be seen to provide an output voltage of minus one volt. It is understood that arbitrary units of voltage are used. The next two magnetic elements, namely those having the coordinates Y1, $Z_2$ and Y1, $Z_3$ store a binary "zero" and provide an output voltage of zero volts. The last magnetic element 12 for this word stores a binary "one" at the coordinate Y1, $Z_4$ and will provide an output voltage of minus "one" volts. Accordingly, the summation of these output signals will produce a voltage of minus two volts on the output wire 28. Since the output signal from the bias generator 42 is also coupled to each of the output wires 28, its voltage must be combined with the output signals thereon. Since the compare register 24 stores the tag 1001, the bias generator 42 will provide an output voltage characteristic of the two binary "ones" stored in the register 24. This characteristic output voltage may also be determined from the chart of FIG. 7, wherein it indicates a plus one volt signal results for each binary "one" stored in the compare register 24, which in this instance would be an output signal of plus two volts. The combination of the bias generator 42 output signal of plus two volts with the minus two volts derived from the reading out of the magnetic elements 12 in the Y1 line produces an overall locating signal on wire 28 of zero volt. This balancing of the two signals indicates a match between the word in the compare register 24 and the word stored in the Y1 line to thereby define a locating signal.

Now considering the tag stored in the Y2 line, it will be shown that a signal characteristic of a mismatch or no locating signal will be provided even though the word 1010 stored in this line has the same number of binary "ones" stored in the compare register 24. The output voltage values for the magnetic elements 12 for the Y2 line can also be determined by the use of the chart of FIG. 7. Following this procedure, it will be seen that the output signals appearing on the magnetic elements 12 for the line Y2, reading from left to right, will be minus one, zero, plus one, and zero volt giving a total of zero volt. Combining this zero volt signal with the plus two volts signal provided by the bias generator 42, the overall output signal will have an overall voltage of plus two volts. This output signal for for the line Y2 will be seen to indicate a mismatch since a matching or locating signal is defined as a zero output signal.

In this same fashion any other combination of binary characters stored in the compare register 24 and the tag portion of the storage apparatus can be examined and it can be shown by mathematical analysis that there will only be one matching tag or one locating signal for any of these combinations.

Figure 3:
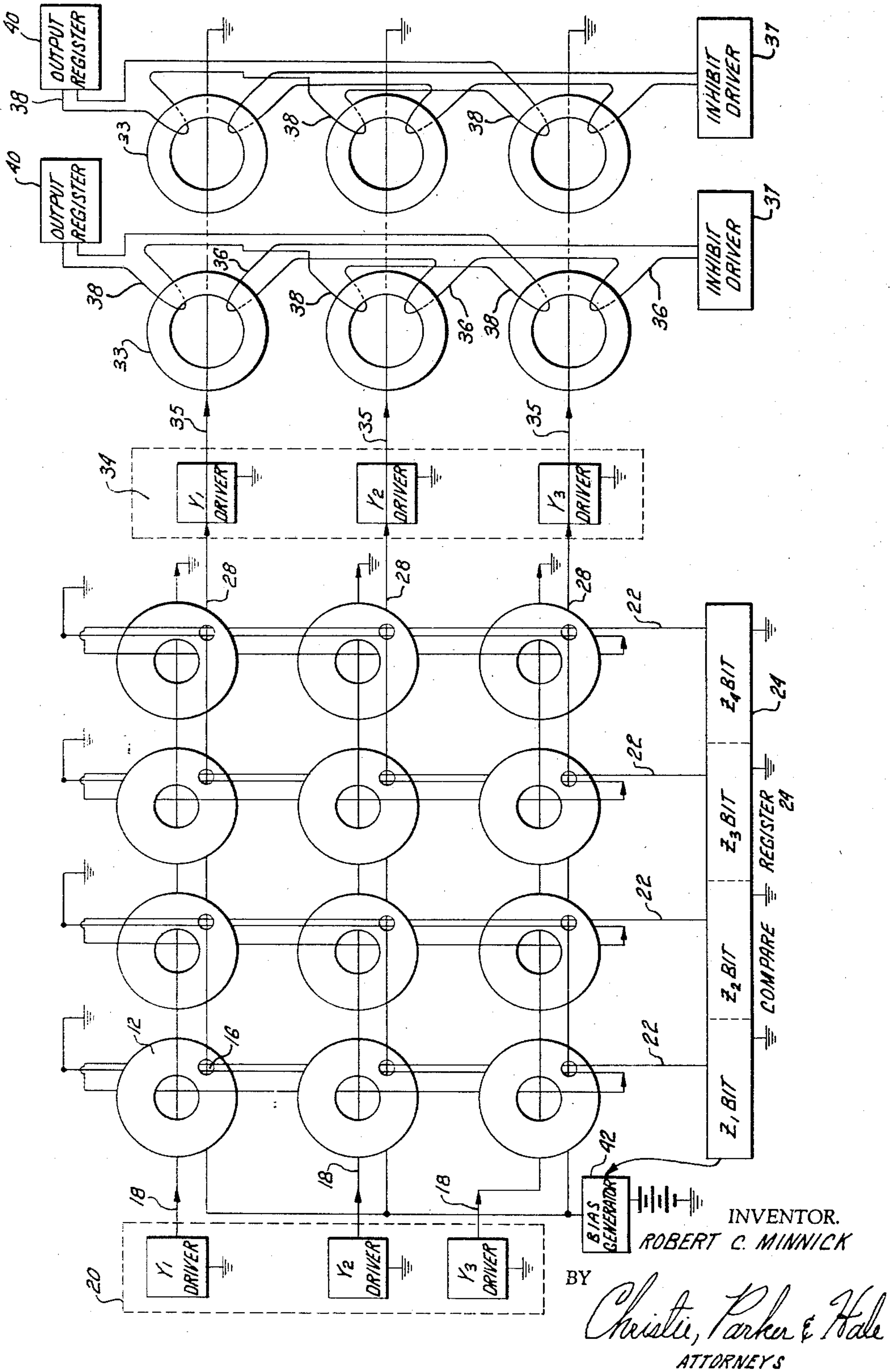
FIG. 3 is a schematic representation of the word identification portion of the storage apparatus.

As indicated in conjunction with the description of the bias generator 42, the generator may include a reference voltage connected in series with the characteristic voltage provided by this generator. This reference voltage will then appear as a portion of the output signal on each output line 28. Therefore, the line providing the zero signal will have a value equal to this reference voltage rather than zero volt. The locating signal provided in this fashion may then be applied to the Y driver 34 associated with the word storage portion of the storage apparatus, in this instance Y1 memory driver. The Y1 driver, as shown in FIG. 3, will actuate the corresponding driver winding 35 coupled to the memory cores 33 arranged in a row corresponding to the Y1 row in the tag portion of the apparatus. Accordingly, for this read out operation the energization of the drive winding 35 will read out each memory core 33 storing a binary "one" into the register 40 individually provided for these cores.

Figure 4:
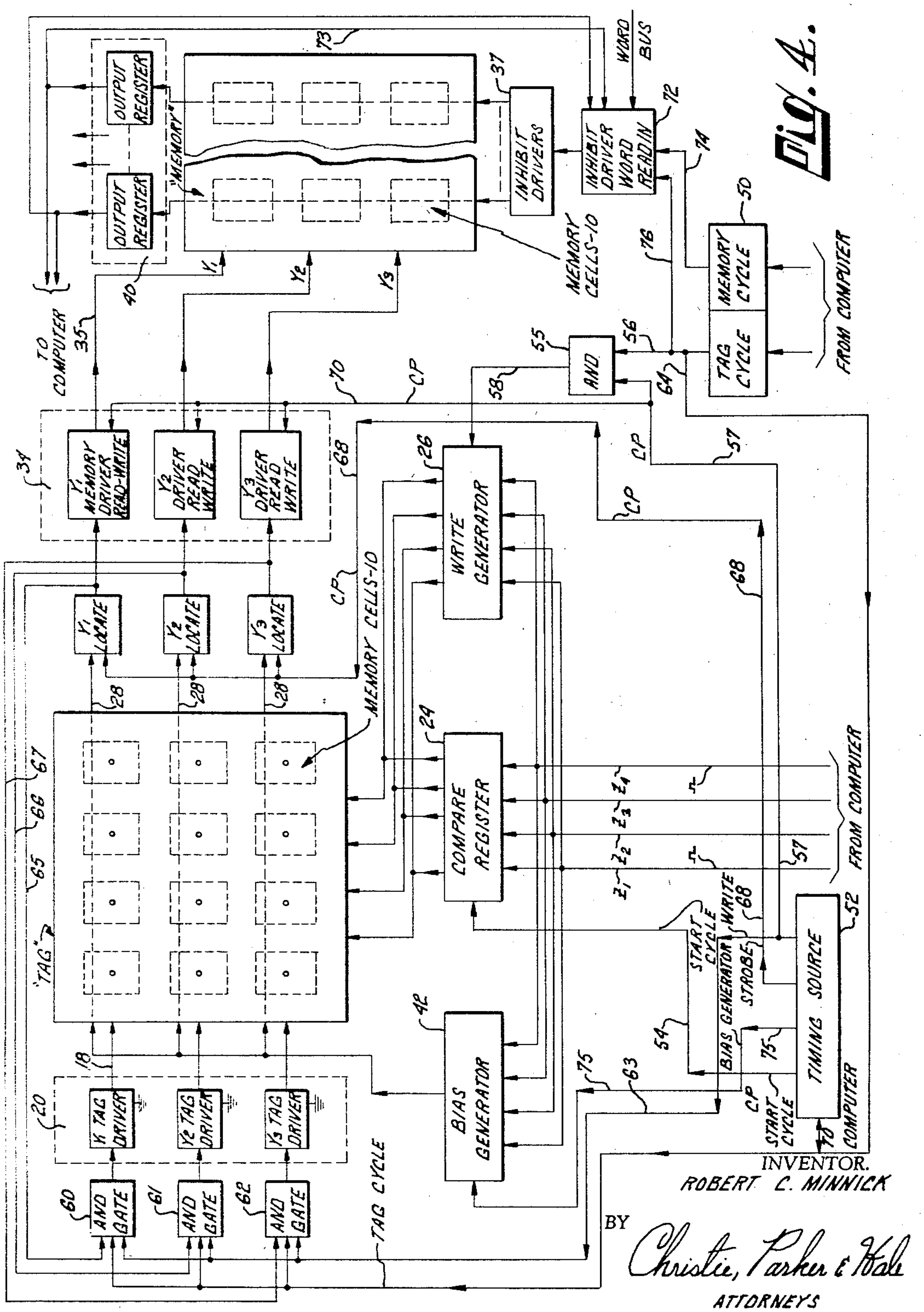
FIG. 4 is a block-wiring diagram of a storage system embodying the invention.

Now referring to FIG. 4, the complete two dimensional storage system comprising a tag and memory portion will be described with reference to the wave forms of FIGS. 5 and 6. The system will be described for a two dimensional array of the type shown in FIG. 3, having a plane for each of the tag and memory portions of the system. The memory cells 10 for the tag and memory portions of the system are both shown in the form of a dotted outline on their respective memory planes with the associated lead wires shown connected to these memory planes to simplify the illustration of the system.

Figure 8:
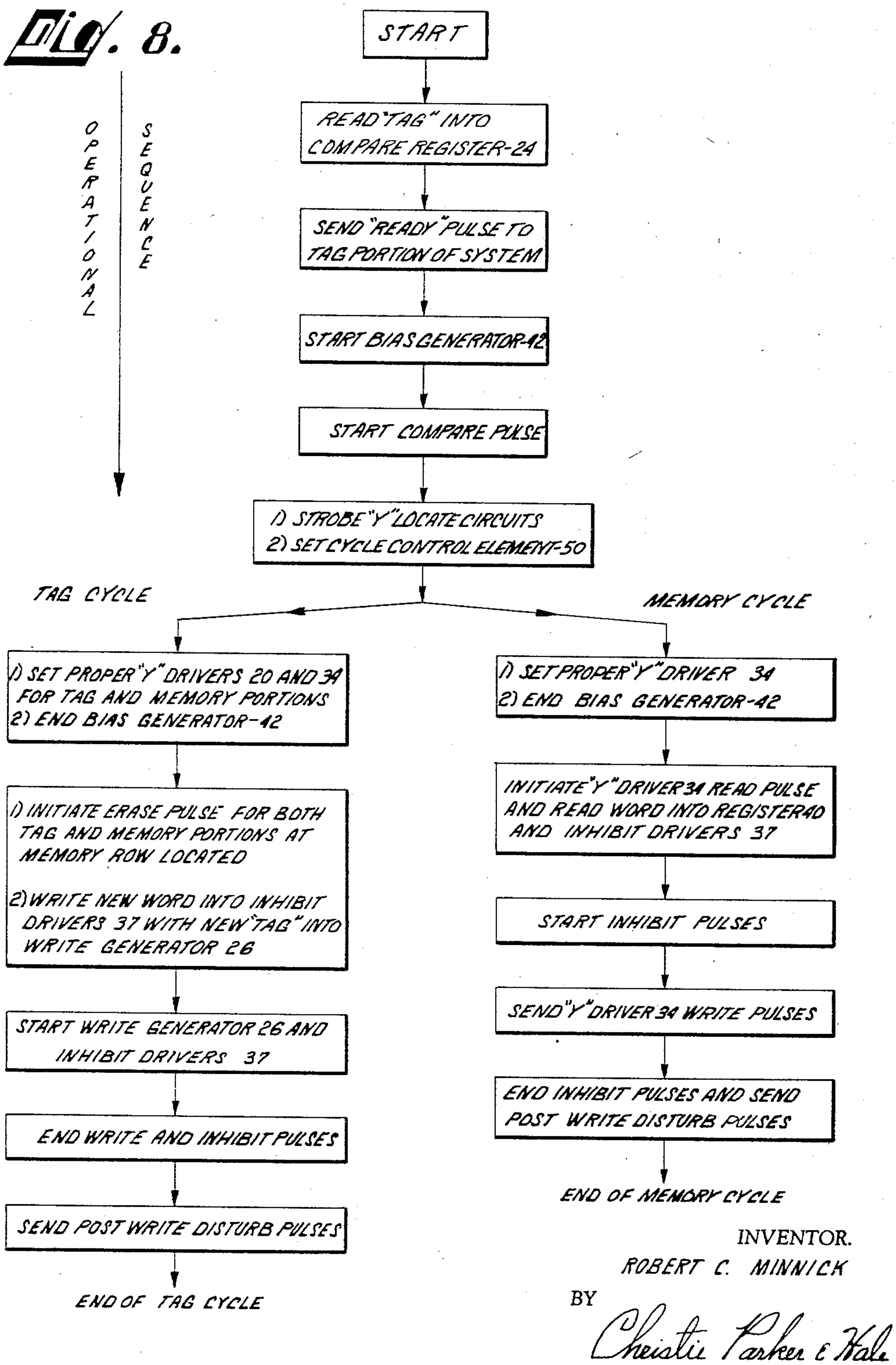
FIG. 8 is a chart illustrating the operational sequence for the storage system.

This two piece storage apparatus is divided into an operational sequence comprising two cycles identified as the tag cycle and the memory cycle; see FIG. 8. The tag cycle provides the erasure of an old word in the storage system including in both the memory portion and its associated identification word in the tag portion and writes a new word and its associated tag into the specified tag and memory locations in the system. The memory cycle on the other hand, upon receipt of the tag of a word to be read out of the system, locates and reads the word out of the memory portion of the system and writes the word back into the same memory location.

The selection of whether the system will sequence through the tag cycle or the memory cycle is under the control of a bistable cycle control element 50. The element 50 receives its input signals from the computer proper and which signals will set the control element 50 in either one of its two states. The left hand portion of the element 50 is identified as the state controlling the initiation of the tag cycle while the other state controls the memory cycle. The operational sequence of the system is under the control of a timing source 52 which provides the timing or clock signals for initiating the various steps for the two cycles of the system. The timing source 52 may comprise a delay line of the type allowing an output signal to be derived at points intermediate its ends. A magnetostrictive delay line, or tapped electromagnetic delay line, or any other delay line well known in the art will suffice for this purpose. It will also be recognized that other sources of timing signals may be conveniently used. The timing source 52 shown in the form of a delay line will then receive a signal from the computer proper at one end and which signal will travel along the delay line towards the opposite end during which travel the clock signals will be derived at predetermined points along the line. In this fashion only a single clock pulse need be provided from the computer proper.

The tag memory plane is arranged with the bias generator 42, compare register 24, and write generator 26 each coupled in a parallel circuit relationship to receive the binary coded bits representative of the tag to be stored in the compare register 24. As illustrated in FIG. 4, these binary bits, $Z_1$–$Z_4$, are received from the appropriate coding apparatus (not shown) in the computer proper. It will be assumed that the tag delivered to the compare register 24 is the tag 1001. The operational sequence for the system is initiated by a clock pulse from the timing source 52. This clock pulse will appear on a lead wire 54 interconnecting the timing source 52 and the compare register 24. This starting clock pulse will be the first clock pulse derived from the source 52, or derived from a transducer nearest the left hand input end of the delay line. The write generator 26 is controlled by a logical "and" gate 55 having two input circuits. One of the input circuits for the "and" gate 55 is connected to be controlled by means of the lead wire 56 to the tag cycle state of the cycle control element 50. The other input circuit for the "and" gate 55 is connected by means of a lead wire 57 to the timing source 52 at the output thereof providing the write cycle clock pulse. This latter clock pulse is the last timing signal to be derived from the timing source 52. The form of the "and" gate 55 is conventional and as shown upon the simultaneous appearance of signals on both the input lead wires 56 and 57, an output signal will be provided on the output lead wire 58, coupling the gate 55 with the write generator 26. The arrival of the signal on wire 58 operates to read the tag out of the write generator 26 to be written into the memory cells 10.

The Y drive source 20 is shown in dotted outline to include the individual Y drivers for the Y lines Y1, Y2, and Y3. Each of these individual Y drivers is provided with a separate "and" gate for controlling same. These "and" gates are respectively identified as the gates 60, 61, and 62, and are of the same general type having three input circuits and with their output circuits connected to the corresponding Y1, Y2, and Y3 drivers. One input circuit for each of the "and" gates 60, 61, and 62 is connected in common by means of the lead wire 63 to receive a clock pulse from the timing source 52 to initiate a writing pulse. This is the same clock pulse that is delivered to the "and" gate 55. The second input circuits for each of the "and" gates 60–62 are connected in common by means of a lead wire 64 connected to the tag cycle state of the cycle control element 50. The remaining signals to the "and" gates 60–62 are derived from the respective Y1, Y2, and Y3 locate circuits. Specifically the output from the Y1 locate is fed back by means of the lead wire 65 to the remaining input for the "and" gate 60. The Y2 locate is connected by means of the lead wire 66 to the "and" gate 61, while the lead wire 67 connects the Y3 locate with the "and" gate 62.

The Y1–Y3 locate circuits comprise two input circuit "and" gates to receive the output signal developed in each output line 28 for the respective tag memory rows. These locate "and" gates are responsive to the locate signal and a clock signal delivered thereto simultaneously to provide a corresponding output signal. The output voltage on the wires 28 that are necessary to energize the Y locate "and" gates is the voltage referred to hereinabove as the reference voltage incorporated into the bias generator 42. The clock pulse provided for these Y locate circuits is delivered simultaneously to each of them by means of a lead wire 68 connected to the timing source 52. This clock pulse may be further identified as a strobing signal and which signal will be effective to read out an output signal for the corresponding Y drivers 34 for the memory portion of the system. Accordingly, the Y driver 34 includes all of the Y read-write drivers for the memory portion of the system. Each Y row of the memory portion is provided with a separate driver which is coupled to the corresponding separate Y locating circuit. In addition to the locating signal delivered to the Y drivers 34, a write clock signal appearing on lead wire 57 is simultanteously delivered to the individual Y drivers by means of a lead wire 70 connected to wire 57. This clock pulse will cause the Y driver to go through a writing operation following the reading operation initiated by a locating signal. The remaining structure shown for the memory portion of the system consists of the conventional inhibit drivers 37. The inhibit drivers 37 are under the control of a unit shown in block form and identified as the inhibit driver word read in 72. The unit 72 also receives the signals, comprising the word read out, from the output register 40 by means of a lead wire 73 and which word is to be written back into the memory portion. The unit 72 is also coupled by means of lead wires 74 and 76 to the memory cycle state of the cycle control element 50. A word bus for reading new words into the memory portion by means of the unit 72 is also identified in the drawing. The state of the cycle control element 50 will determine whether a new word on the word bus or the old word from the output register 40 will be written into the memory. If the control element 50 is the tag cycle state, the word bus is selected while the memory cycle state writes the word from register 40 into memory.

With this structure in mind, the operational sequence for the storage apparatus will be described in conjunction with the chart of the operational sequence shown in FIG. 8. It will be recognized from examining FIG. 8 that the initial portion of the operational sequence for both the tag cycle and the memory cycles are the same. Assuming once again that the tag 1001 is stored in the compare register 24, write generator 26 and bias generator 42 and the Y1 row of memory cells 10, the system will have been prepared to go through the operational sequence. It will be further assumed that the cycle control element 50 has been set to actuate a tag cycle.

After the arrival of the clock pulse, from the computer proper, at the input to the timing source 52, the lead wire 54 will be energized and the compare register 24 will be actuated to thereby send a ready pulse to each column of magnetic elements 12 comprising the tag portion of the apparatus. The ready pulse will be followed in time by a clock pulse appearing on the lead wire 75 effective to actuate the bias generator 42, as indicated in FIG. 5. The bias generator 42 will provide its characteristic output signal (plus two) plus the reference voltage. Following the actuation of the bias generator 42 the compare register 24 will provide the comparison pulses for each column of magnetic elements 12 to read out the information stored therein on the output wires 28. Since the Y1 row of elements 12 stores the tag 1001, it will be this same Y1 output wire 28 which will provide the locating signal. This locating signal appears only on one of the Y1 lead wires 28 and will be coupled into the corresponding individual Y1 locate circuit. The clock pulse appearing on the lead wire 68 will then be seen from FIG. 5 to strobe each of the locating circuits Y1–Y3 during the actuation of the bias generator 42 and which locating circuits will provide an output indication at only the output circuit for the Y1 locate circuit. The Y1 read-write memory drivers of the driver circuit 34 will then in turn become energized as a result of the output signal from the associated Y1 locate circuit. This portion of the operational sequence is the common portion for both the tag and memory cycles.

The portion of the operational sequence characteristic of the tag cycle will now be examined. To this point in the tag cycle sequence we have located the row of memory cells 10 to be erased and written into. Also during this interval the bias generator 42 will become deenergized. It will be recalled that the initiation of a write operation comprises the steps of erasing followed by writing. The order of the erasing and writing pulses are shown in FIG. 5. This writing operation is initiated a preselected time interval after the strobing clock pulse by the appearance of the same write clock pulse on lead wires 57 and 63. This write clock pulse appearing at "and" gate 60, with the signal on lead wire 64 provided by the tag state of the control element 50 and the Y1 locate output signal on lead wire 65, will provide an output pulse from the gate 60 to energize the Y1 tag driver. During this same interval the Y1 memory driver is also energized. Subsequently, the memory cells 10 in both portions of the system will be erased or placed in the binary "zero" state as a result of energizing the mentioned Y1 driver circuits. It will be understood that the read-write driver 34 for the memory portion of the system at this time have been set to write as a result of the signal on wire 70 for the tag setting of the cycle control element 50.

Assuming a new tag has been delivered to the compare register 24 and the corresponding word from the word bus has been delivered to the inhibit drivers 37, following this, the write generator 26 and the inhibit drivers 37 are actuated. The inhibit drivers 37 are under control of the unit 72 receiving the information from the word bus. The write generator 26 is started by the signal on the lead wire 58 as a result of the simultaneous occurrence of a signal on lead wire 56 provided by the tag state of the element 50 and the write clock pulse received by means of the lead wire 57. The starting of the write generator 26 will occur at a predetermined interval after the erase pulse to energize the compare windings 22 for the magnetic elements 12 in a coincidental time relationship with the energization of the Y1 tag drivers. The Y1 tag drivers and the write generator 26 each provide a "one-half" write pulse to each magnetic element 12 to store a binary "one." The magnetic elements 12 storing a binary "zero" are not switched since they have only the "one-half" write pulse from the Y1 drive applied thereto. Also, during this interval the writing pulse from the Y1 memory driver is applied in a coincidental time relationship with the application of the inhibit pulses as shown in FIG. 5. The inhibit pulse is followed by a post write disturb pulse after which the tag cycle is terminated leaving the new words stored in the tag and memory portions.

As indicated hereinabove, the sequence for the memory cycle is identical to the tag cycle down to the point where the locating signal energizes the correct Y driver for each portion of the system. To follow this memory cycle, then the cycle control element 50 will be set to its memory cycle state so that each of the memory drivers 34 are set to read out the selected word in the memory portion. Accordingly, assuming the locating signal appears on the Y1 locate circuit, the Y1 read driver will be energized to read out the word stored on the Y1 line of memory cells 10 for the memory portion of the system. The word read out in this fashion will be stored in the output register 40 and in turn will be read into the inhibit drivers 37 by means of the unit 72. This then will energize the inhibit drivers 37. At this same time the Y1 memory driver will provide a writing pulse, and at the cells 10 not receiving an inhibit pulse, a binary "one" will be stored. Following the remaining steps shown in FIG. 8, the word read out will be read back into the same location in the memory and in sequence the inhibit pulses and post write disturb pulses will be terminated, ending the memory cycle.

Figure 9:
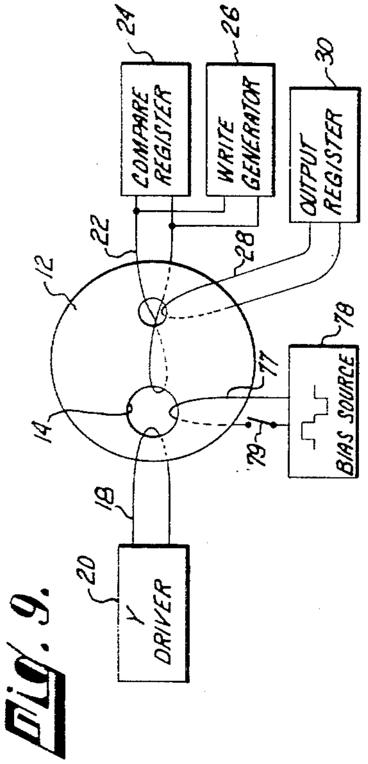
FIG. 9 is a schematic representation of a modified memory cell utilized in the word identification portion of the storage apparatus.

Now referring to FIG. 9, wherein a modified magnetic element 12 for use in the tag portion of the system will be examined. The magnetic element 12 of FIG. 9 is the same as the element shown in FIG. 1 with the addition of a bias winding 77 interlaced through the large aperture 14 to control leg 1 of the element 12. The bias winding 77 is provided to improve the signal to noise ratio of the output signal appearing on the winding 28. The bias winding 77 is shown connected to a bias source 78 through a switch 79 controlling the energization of the winding 77. The bias source 78 is arranged to provide a biasing current to position the magnetic element 12 at a point on its B–H curve of FIG. 10, other than at a point where H=O. Assuming that when the magnetic element 12 is in a state of positive remanence, a binary "one" is recorded and negative remanence corresponds to a binary "zero." Further assuming that without the application of bias to the winding 77, the magnetic element 12 will be positioned at some point *a* when it is storing a zero. Accordingly upon the closure of the switch 79, the bias source 78 is arranged to position the magnetic element 12 at some point such as the point −H. Therefore, for coincident current operation of the magnetic element 12 it will be seen that a larger one-half select current may be utilized to drive the magnetic element 12 from the point −H to a point adjacent the knee of the B–H loop without switching the magnetic state of the element 12. The application of the total selection current applied to the magnetic element 12 will drive the magnetic element 12 to a point such as the saturation point "*b*" when the core is switched from its binary "zero" to the binary "one" state.

However, it is not necessary to drive the core to such a point of magnetic saturation but merely provide sufficient selection current to switch the core. Accordingly, through the use of the bias for the magnetic element 12, the total selection current that is employed may be reduced to provide an improved signal to noise ratio for the magnetic element 12. It will be recognized that the amplitude of the bias when the magnetic elements 12 are used in an arrangement of the type disclosed will be limited by the fact that some of the magnetic elements 12 will be in the binary "one" state while others will be in the binary "zero" state and the bias must be proportioned below the current required to switch the element. A magnetic element 12 that is not to be switched will move back to its remanence point after the termination of the bias current.

The bias source 78 would be arranged in the above system to provide a bias during the erasing and writing times. To this end, during the erasing time a positive pulse will be applied to the bias winding 77 followed by a negative pulse during the writing interval. In the two dimensional arrangement as illustrated in FIG. 3, the biasing winding 77 will be interlaced through each of the magnetic elements 12 in a single plane in a series circuit relationship. Also, the application of the bias source 78 in the arrangement of FIG. 3 would be controlled by an "and" circuit coupled to the source 78, the tag state of control element 50 and the writing clock appearing on lead wire 63.

Figure 11:
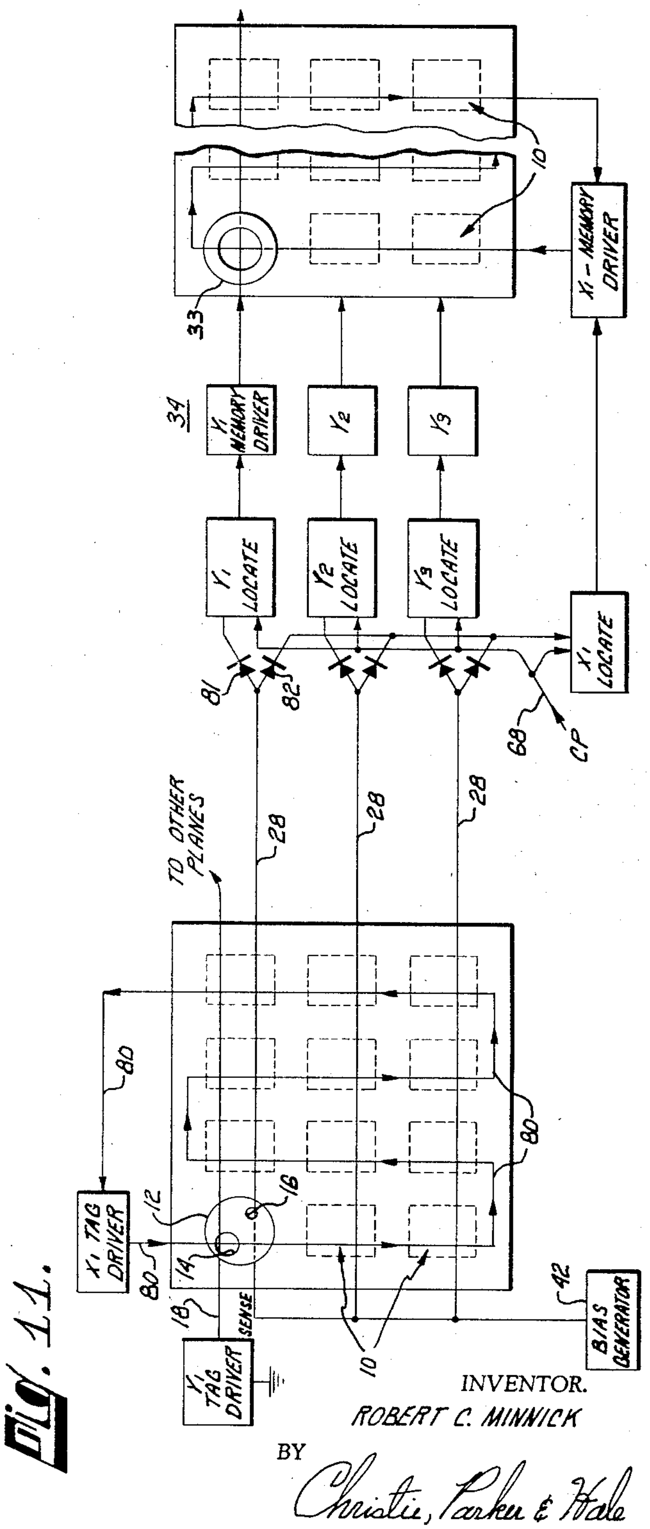
FIG. 11 is a simplified, partial block-wiring diagram for a three dimensional storage arrangement embodying the invention.

Now referring to FIG. 11 wherein a portion of a three dimensional storage array is illustrated, the modifications for incorporating the invention in such a system will be described. The drawings of FIG. 11 have been simplified merely to show the additional wiring required in going from a two dimensional to a three dimensional arrangement. A single memory plane and a single tag plane for this purpose are shown as they would be interconnected in a three dimensional array. One of the magnetic elements 12 and one of the memory cores 33 are shown in their respective planes while the remainder of the memory cells 10 are shown in dotted outline. Accordingly, only the additional wiring required for the magnetic element 12 and the magnetic core 33 illustrated are shown. When a plurality of memory planes of the type shown in FIG. 11 are arranged in a three dimensional array, the Y drive winding 18 for a particular horizontal row or Y coordinate will be interlaced through the memory cells 10 for the same row in each of the memory planes. The Y drive winding 35 for the memory cores 33 are also arranged in the same fashion so as to interlace each of the cores 33 on the various memory planes having a same Y coordinate. This necessarily implies that the words are stored in the tag and memory planes along the horizontal rows of a single plane such as described hereinabove.

Therefore, for this three dimensional arrangement a means must be provided to identify the particular plane to be read along with the particular row located. This means is identified as the X1 tag driver which is coupled by means of a lead wire 80 through the large aperture 14 of each of the magnetic elements 12, in a series circuit relationship so as to excite all of the cores in a single plane. In the same fashion an X1 memory drive is provided for the memory plane, and the X1 winding will be interlaced through each of the memory cores 33 of the memory plane in the same fashion. It will then be seen that it would require the coincident application of a current to the X and Y winding for each memory element 10 in a row to select a row of memory cells 10.

Upon developing a locating signal on any one of the sense wires 28 it is necessary to provide the X and Y coordinate signals therefrom for reading out the memory cores 33. These signals result from a provision of a pair of diodes such as the diodes 81 and 82 connected in parallel circuit relationship with the output wire 28 for the Y1 row. These diodes are arranged in each of the wires 28 so that only one pair will provide an output signal in response to the locating signal generated on the one output wire 28. The diode 81 will provide a signal for the Y1 locate circuit when the correct locating signal appears on its associated wire 28 while the diode 82 will provide a signal for the X1 locating circuit. The X1 locating circuit will be an "and" circuit of the types specified for the Y locates. The X and Y locate circuits may then be both strobed by the same clock pulse namely that appearing on the lead wire 68 previously described. After strobing the X and Y locate, the output signals are delivered to X and Y memory drivers, in this instance the X1, Y1 drivers. The coincidental application of currents from these drivers will then read out the memory cells 10 in row Y1 for the X1 memory plane. The Y1 row for the other planes will be only half selected. In this same fashion the writing operation for both the tab and memory portions may be achieved.

It should be noted that other word storage arrangements may be employed other than those discussed hereinabove. The storage apparatus also may be further expanded to four dimensions or any other arrangement well known in the art. Some of these arrangements are discussed and described in the above identified text by R. K. Richards.

It will now be seen that this invention has advanced the state of the storage apparatus art through the provision of a two piece storage apparatus capable of retrieving information directly therefrom without sequencing. The improved storage apparatus allows direct access to each of the memory cells resulting in more flexibility for the programmer.

This type of storage system is suited for non-dense numbering, wherein blank spaces are left for future use, since sequencing or address need not be known. Also, a non-dense numbering arrangement can be translated by this system to a dense numbering arrangement. It should also be recognized that although the invention has been described in conjunction with a digital computing system, the applications of the invention are numerous. Some of these applications may be in high speed printing systems of the type wherein all the same characters in a line to be printed are printed at one time whereby the characters are printed in sequence. One of such printing systems is commercially known as the "Flying typewriter" printer. Also, the invention is ideally suited for sorting applications wherein the compare register may comprise a counter. The counter would be sequentially stepped through its range and at each step would command a compare cycle. The apparatus would in this fashion seek out the stored information wherever it is stored and automatically provide this information sorted in proper order. It will also be recognized by those skilled in the art that checking circuitry is possible to detect no matches and multiple matches. Furthermore, it is possible to remove tags automatically from the storage system by a slight modification in the described program and to insert new items in the apparatus. The length of the words that may be stored in the apparatus may be increased by suitable multiplexing techniques. It will also be recognized that in the conventional portion of the storage apparatus memory cells having a non-destructive read-out characteristic may also be employed.

What is claimed is:

1. Apparatus including a plurality of memory cells arranged in a preselected pattern of information groups, each of said memory elements characterized as non-destructive cells having at least three distinct stable states, means for substantially simultaneously delivering the same binary coded signals to each group of said memory cells for reading out same, means responsive to said binary coded signals for providing a comparison signal characteristic of the number of binary characters of a preselected kind, and circuit means for combining the comparison signal with the signals read out of each information group of said memory cells whereby the thus combined signals from one of said groups of memory cells provides a unique signal when a group of the memory cells store the same group of binary coded signals as delivered thereto.

2. Storage apparatus including two storage portions each having a plurality of memory cells arranged in the same preselected pattern of information groups, each of said memory cells characterized as non-destructive cells and having at least three distinct stable states, means for substantially simultaneously delivering the same binary coded signals to each group of said memory cells comprising one of said portions for sensing same, means responsive to said binary coded signals for providing a comparion signal characteristic of the number of binary characters of a preselected kind, circuit means for combining the comparison signal with the signals read out of each information group of said memory cells whereby the thus combined signals from one of said groups provides a locating signal for the other portion of said storage apparatus, and means responsive to said locating signal for applying same to the group of memory cells in the other portion of said storage apparatus at a corresponding location.

3. Storage apparatus comprising a plurality of memory cells arranged in rows and columns and switchable in response to the coincidental delivery of signals to change the storage condition thereof and providing a sensing output signal characteristic of said storage condition upon the delivery of one of said signals, each of said memory cells characterized as non-destructive cells having at least three distinct states, input means coupled to each column of elements for delivering the same binary coded signal to all of the elements in each column in a parallel circuit relationship, drive circuit means coupled to the individual row of said elements for delivering drive signals thereto in a substantially coincidental time relationship with the delivery of the signals from said input means for switching the storage condition of said elements, means responsive to the input binary signals for providing an electrical signal characteristic of the number of a preselected kind of binary signal and coupled to each row of elements for combining said characteristic signal in a time relationship with the delivery of the binary coded signals to said elements whereby one of the combinations generates a unique signal.

4. Storage apparatus as defined in claim 3 wherein said memory elements comprise magnetic elements having a substantially square hysteresis loop and a non-destructive read out characteristic.

5. A system comprising a plurality of magnetic cores arranged in rows and columns, said cores having a substantially rectangular hysteresis characteristic and a plurality of apertures for defining first, second and third legs in said cores to establish a pair of controllable flux paths of substantially different lengths linking said legs, an input winding magnetically coupled to each of the cores in a row for controlling the flux in said first and second legs and thereby the magnetic state thereof, means for energizing said input windings, a compare winding coupled to each of the cores in a column for controlling the flux in at least said third leg, and an output winding coupled to each of the cores in a row for responding to flux changes produced in said third leg, means coupled to each of said compare windings for delivering binary coded information signals thereto, and means responsive to said binary coded information signals for generating a signal characteristic of the binary coded information signals and coupled to each of the output windings for combination with the output signals therein to provide a word locating signal.

6. A system as defined in claim 5 including a bias winding coupled to each of the plurality of magnetic cores in a series circuit relationship to control the flux in said first and second legs and means for applying a biasing voltage to said winding in a time relationship with the energization of said input windings.

7. A system including a plurality of magnetic cores arranged in rows and columns, said cores having a substantially rectangular hysteresis characteristic and a plurality of apertures for defining first, second and third legs in said cores to establish a pair of controllable flux paths of substantially different lengths linking said legs, an input winding magnetically coupled to each of the cores in a row for controlling the flux in said first and second legs and thereby the remanence condition thereof, means for energizing said input windings, a compare winding interlaced through both of said apertures for each of the cores in a column in a figure eight configuration for controlling the flux in said second and third legs, and an output winding coupled to each of the cores in a row for responding to flux changes produced in said third leg, means coupled to each of said compare windings for delivering binary coded information signals thereto, means responsive to said binary coded signals for generating a signal characteristic of the binary coded information signals of a different polarity from said latter mentioned signals and coupled to each of the output windings for combination with the output signals therein to provide a unique signal, and means coupled to each of the output windings for responding to the unique signal to provide a locating signal.

8. A system comprising a word identification portion including a plurality of magnetic cores arranged in rows and columns, said cores having a substantially rectangular hysteresis characteristic and a plurality of apertures for defining first, second and third legs in said cores to establish a pair of controllable flux paths of substantially different lengths linking said legs, an input winding magnetically coupled to each of the cores in a row for controlling the flux in said first and second legs and thereby the remanence condition thereof, means for energizing said input windings, a compare winding coupled to each of the cores in a column for controlling the flux in at least said third leg, and an output winding coupled to each of the cores in a row for responding to flux changes produced in said third leg, means coupled to each of said compare windings for delivering binary coded information signals thereto, means responsive to said binary coded information signals for generating a signal characteristic of the binary coded information signals and coupled to each of the output windings for combination with the output signals therein to provide a word locating signal, a word storage portion including a plurality of magnetic cores having a substantially rectangular hysteresis characteristic arranged in rows and columns with each of said cores having at least two stable states and at least an input winding coupled to each core in a row and connected to be responsive to the word locating signal, and an output winding for each word storage core.

9. A system as defined in claim 8 wherein said compare windings portion includes a winding portion coupled to the second leg whereby the winding has a figure eight configuration and said means for delivering signals to said compare windings delivers a pair of signals of opposite polarity to respectively place the magnetic cores in a preselected state to be read out by the succeeding read out signal of opposite polarity.

10. A system as defined in claim 8 wherein said means for delivering signals to said compare windings includes a signal to set the magnetic cores to a preselected state whereby the signals read out have a predetermined polarity and said means for generating a characteristic signal provides signals of opposite polarities to the read out signals.

11. A memory including a word locating or tag storage portion including a plurality of memory elements arranged in rows and columns, each of said elements having each of said memory elements characterized as non-destructive elements and having at least three distinct stable states and common output means coupled to each memory element for each row and a common compare means coupled to each memory element for each column of elements, means for delivering a group of binary coded information signals representing a tag to each of the common compare means for said elements of a column to read out the storage condition of the elements, means responsive to the binary coded information signals for delivering a signal characteristic of the number of binary characters of a preselected kind comprising the tag to each of said output means for combination with the signals read out of said elements whereby a word locating signal is provided on at least one of said output means, a word storage portion having a plurality of memory elements arranged in rows and columns, each of said memory elements having at least two stable states and a common read out means for each row of elements connected to the corresponding row of the locating storage portion whereby the word locating signal is effective to operate on the correct group of memory elements.

12. A memory including a word locating or tag storage portion including a plurality of non-destructive memory elements arranged in rows and columns, each of said elements having common output means coupled to each memory element for each row and a common compare means for each column of elements, means for delivering binary coded information signals representative of a tag to each of the common compare means for said elements of a column to read out the storage condition of the elements, means responsive to the binary coded information signals for delivering a signal characteristic of the number of binary characters of a preselected kind comprising the tag to each of said output means for balancing out the signals read out of said elements whereby a word locating signal is provided on at least one of said output means, a word storage portion having a plurality of memory elements arranged in rows and columns, each of said memory elements having at least two stable states and a common readout means for each row of elements connected to the corresponding row of the locating storage portion whereby the word locating signal is effective to operate on the correct group of memory elements.

13. Storage apparatus comprising a plurality of memory elements arranged in rows and columns, each of said elements having a non-destructive read out characteristic and at least three distinct stable states, an electrical drive means coupled to each row of memory elements for delivering electrical signals substantially simultaneously to all of the elements of a row, input register means coupled to each memory element of a column for delivering electrical signals representative of a tag to said elements in a time relationship with the delivery of the signals from said drive means, input means being capable of delivering binary coded tag signals representative of information to be read into or signals to be read out of a row of memory elements, said input means delivering binary coded signals in a coincident time relationship with the energization of said drive means for the row for writing the signals into said row, and means coupled to said input means and responsive to a preselected binary character comprising the tag to provide an electrical signal characteristic of the number of said preselected binary characters, said latter mentioned means being operative to provide the characteristic signal for each row of elements in a time relationship with the read out signals to provide a locating signal.

14. Storage apparatus as defined in claim 13 wherein each of said memory elements comprises multiple flux path magnetic storage elements.

15. Storage apparatus as defined in claim 13 including a storage portion having a plurality of memory elements capable of storing binary coded information and arranged in rows and columns, said latter mentioned memory elements having at least two stable states for storing binary coded information in a correlated location to the information stored in said first mentioned memory elements to be responsive to the locating signal.

16. A method of comparing and locating stored information from a plurality of memory cells arranged in a preselected pattern of information groups, storing information, including the steps of simultaneously applying a signal to be compared to each group of said memory cells to read out a signal representative of the information stored in each cell, and combining the read out signals from each information group with the same signal characteristic of the information to be retrieved to thereby produce a unique signal when a group of the memory cells store the same group of binary coded signals as delivered thereto.

17. A method of handling information having a word portion and a characteristic word identification portion in storage apparatus having a word storage portion and a word identification storage portion including arranging a plurality of memory cells in the word identification portion to store word identification information for preselected words, and each of said word identification cells characterized as non-destructive cells having at least three distinct stable states, and which method includes the step of arranging a plurality of memory cells in the word storage portion corresponding to the location of said memory cells in the word identification portion, substantially simultaneously applying the word identification information to each of the memory cells in the word identification portion to read out the information stored in each cell, combining the information thus read out with a signal characteristic of the word identification information to be retrieved to thereby produce a locating signal for the memory cells in the word storage portion, and applying the thus derived locating signal to the memory cells of the word storage portion.

18. Apparatus for simultaneously comparing a plurality of binary coded words comprising a plurality of memory cells having at least three distinct stable states and a non-destructive sensing characteristic, said memory cells are arranged in groups for storing binary coded words, means for delivering and storing binary coded words to be compared to each group of memory cells, means for substantially simultaneously applying a binary coded word to be compared with the words stored in each group of memory cells for sensing the state of each cell and providing a comparison signal corresponding thereto, and means for applying a preselected bias signal to each group of memory cells for combining with the comparison signals derived from a group of cells representing a word whereby the combinations of bias and comparison signals provides a unique output signal from one of said group of memory cells.

19. Apparatus including a plurality of memory elements having a non-destructive sensing characteristic and arranged into a plurality of preselected groups for storing words, means for writing and storing binary coded words into each group of memory elements, means for substantially simultaneously applying a word to be compared to each group of memory elements for comparison with the words stored therein, said latter-mentioned means being effective to sense the binary state of each memory element to provide three different comparison signals therefrom in accordance with the relative binary value of the binary characters of the two words being compared, and circuit means including a preselected signal for combination with the comparison signals from each group of memory elements to thereby indicate equality of words when one of the combinations provides a unique signal.

20. A method of simultaneously comparing a plurality of pieces of binary coded information, including the steps of storing a plurality of pieces of information to be compared in a plurality of memory cells having a non-destructive characteristic and at least three distinct stable states, substantially simultaneously applying a piece of known information identical to one of the stored pieces of information to all the memory cells storing pieces of information to sense the character of the binary signals stored in each cell, generating a signal characteristic of the number of binary characters of a preselected kind in the piece of known information, and combining the latter-mentioned signal with the sensing signals produced from each group of memory cells comprising the same piece of information whereby only one of the combinations produces a unique signal indicative of equality.

21. Apparatus comprising a plurality of memory cells for storing coded information and arranged in a preselected pattern of information groups, and means for substantially simultaneously applying coded input information to each information group of memory cells for determining the presence and/or location of the input information by the generation of output signals from each memory cell whereby a composite output signal for each information group indicates the presence and/or location of the input information by a unique signal.

22. Apparatus as defined in claim 21 including another plurality of memory cells for storing binary coded information and arranged in a preselected pattern of information groups, the latter information groups being correlated to the first-mentioned information groups, and means responsive to said unique signal for switching the state of the cells of the latter information group correlated to the group producing the unique signal.

23. Apparatus comprising a plurality of memory cells arranged in a preselected pattern of information groups for storing coded words comprising bits of information; and circuit means for substantially simultaneously applying coded information bits to be compared to each information group of memory cells containing information previously stored, the corresponding bits of the information being compared being applied to the corresponding cell of an information group for generating output signals from the cells in accordance with the relative values of the information undergoing comparison and the stored information whereby a composite output signal for each information group produces a unique output signal only when the information undergoing comparison is stored in an information group.

24. A multiple electronic comparing device for simultaneously comparing a plurality of memory words with a test word, comprising: a comparison register; a magnetic core matrix having bit storage elements arranged in bit order columns and word rows; columnar lines, each respectively related to a particular bit order, associated with a bit storage element in said comparison register and traversing the corresponding order bit storage element of each memory word; word sense lines traversing the word rows of bit storage elements, each word sense line being related to a particular word row; and means controlled by the values of the particular bits in the comparison register and by respectively different values of the corresponding order bit storage elements in the memory for generating mismatch pulses along word sense lines traversing said bit storage elements.

25. A switching device for producing an output signal on one of a plurality of output leads according to the binary representation of an input code, said device comprising: a plurality of storage elements arranged in rows and columns, said rows corresponding in number to the number of said output leads and said columns corresponding in number to the number of binary digits in said input code; interrogation signal generator means for producing interrogation signals corresponding respectively to the binary digits of said input code; means for applying each interrogation signal produced by said signal generator to all of the storage elements in a corresponding column of said storage elements; means in circuit connection with each storage element for interpreting the signal received from said signal generator means and the state of the corresponding storage element to produce an output signal indicating the comparison therebetween; and output means for combining rows of said storage elements to produce said output signals, each output signal representing the result of all comparisons performed along a corresponding row.

References Cited

UNITED STATES PATENTS

| | | | |
|---|---|---|---|
| 2,844,309 | 7/1958 | Ayres | 340—149 |
| 2,869,112 | 1/1959 | Hunter | 340—174 |
| 2,898,581 | 8/1959 | Post | 340—174 |
| 2,911,631 | 11/1959 | Warren | 340—174 |

FOREIGN PATENTS

| | | |
|---|---|---|
| 1,155,548 | 5/1958 | France. |

JAMES W. MOFFITT, *Primary Examiner.*

U.S. Cl. X.R.

340—146.2, 172.5